(12) United States Patent
Tang et al.

(10) Patent No.: US 11,404,949 B2
(45) Date of Patent: Aug. 2, 2022

(54) LINEAR VIBRATION MOTOR

(71) Applicant: AAC Technologies Pte. Ltd., Singapore (SG)

(72) Inventors: Yun Tang, Shenzhen (CN); Lubin Mao, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 357 days.

(21) Appl. No.: 16/703,822

(22) Filed: Dec. 4, 2019

(65) Prior Publication Data
US 2020/0212779 A1    Jul. 2, 2020

(30) Foreign Application Priority Data
Dec. 29, 2018  (CN) .......................... 201822267386.9

(51) Int. Cl.
*H02K 33/16* (2006.01)
*H02K 33/18* (2006.01)
*H02K 33/02* (2006.01)
*H02K 33/06* (2006.01)
*B06B 1/04* (2006.01)

(52) U.S. Cl.
CPC ............. *H02K 33/18* (2013.01); *H02K 33/02* (2013.01); *H02K 33/06* (2013.01); *H02K 33/16* (2013.01); *B06B 1/045* (2013.01)

(58) Field of Classification Search
CPC .......... H02K 1/34; H02K 33/02; H02K 33/06; H02K 33/16; H02K 33/18; B06B 1/045
See application file for complete search history.

(56) References Cited

FOREIGN PATENT DOCUMENTS

| CN | 205792148 B1 | 12/2016 |
|---|---|---|
| CN | 206041770 B1 | 3/2017 |

OTHER PUBLICATIONS

PCT search report dated Dec. 30, 2019 by SIPO in related PCT Patent Application No. PCT/CN2019/113359 (5 Pages).

*Primary Examiner* — Ramon M Barrera
(74) *Attorney, Agent, or Firm* — W&G Law Group

(57) ABSTRACT

The present invention provides a linear vibration motor including a housing with; a vibrator and a stator accommodated in the housing; and elastic support parts suspending the vibrator in the accommodation space. Each elastic support part includes a first installation part fixed to the housing, a second installation part fixed to the vibrator, a first extension part connecting with one end of the second installation part, a second extension part, and a third extension part fixedly connected with the first installation part. By virtue of the invention, the stress generated by the vibration of the vibrator is respectively borne by the two extension parts between the two fixation parts of the elastic support parts. The elastic support parts are more difficult to deform. Accordingly, the linear vibration motor has better reliability.

6 Claims, 2 Drawing Sheets

LINEAR VIBRATION MOTOR

FIELD OF THE PRESENT DISCLOSURE

The present invention relates to a linear vibration motor, particularly to a linear vibration motor used in portable consumer electronic products.

DESCRIPTION OF RELATED ART

With the development of electronic technology, portable consumer electronic products are more and more favored by people, such as mobile phones, handheld game consoles, navigation devices or handheld multimedia entertainment devices. These electronic products generally use linear vibration motors for system feedback, such as the call reminder, information reminder and navigation reminder of mobile phones, vibration feedback of game consoles, etc.

In a relevant technology, a linear vibration motor comprises a housing, a vibrating component, and an elastic support part which suspends and supports the vibrating component in the housing. Generally, the elastic support part is in a U shape. One end of the elastic support part is connected with the housing, and the other end is connected with the vibrating component. The elastic support part bears all stress generated by the vibrating component, and therefore, the elastic support part is easy to deform during vibration, which decreases the reliability of the product.

Thus, it is necessary to provide an improved linear vibration motor to solve the problems above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
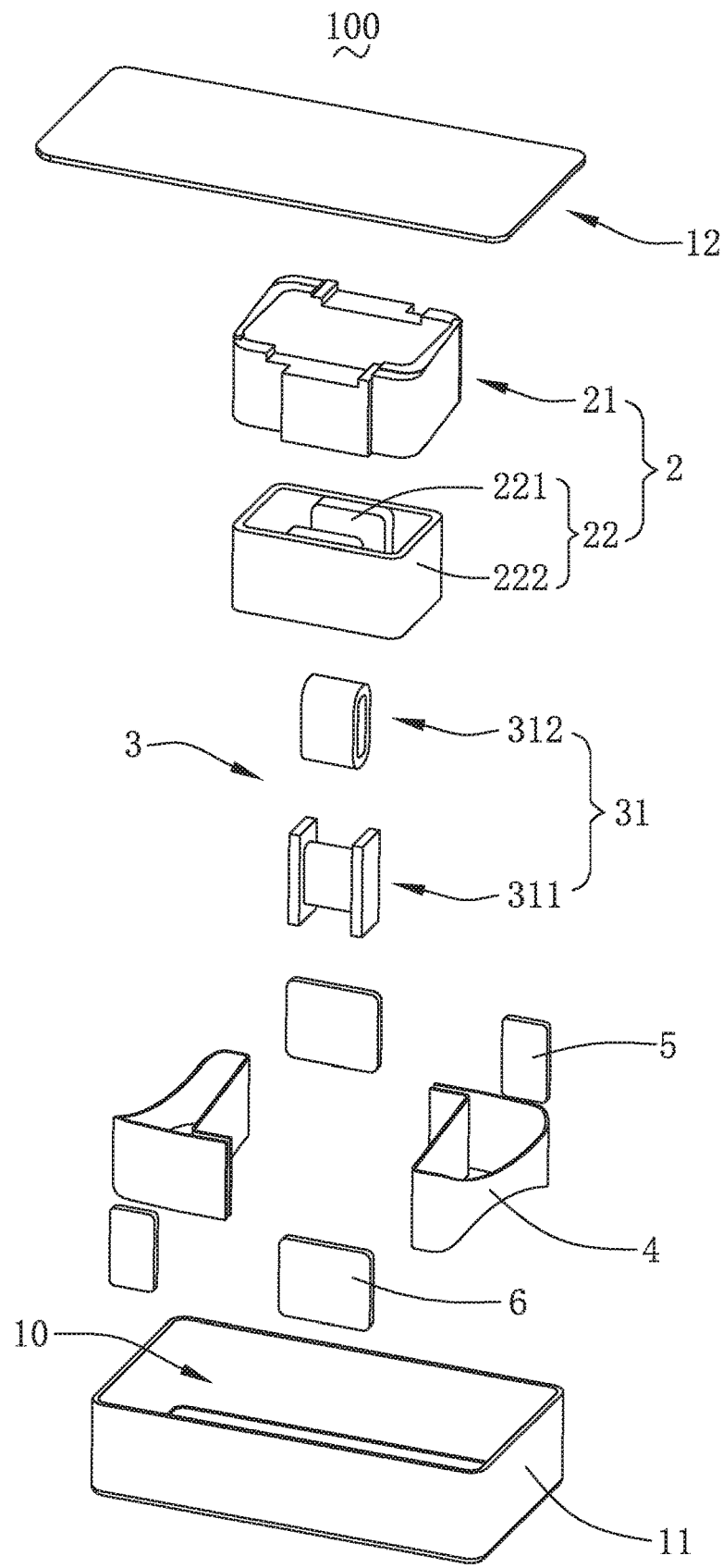
FIG. 1 is an isometric view of a linear vibration motor in accordance with an exemplary embodiment of the present invention.
Figure 2:
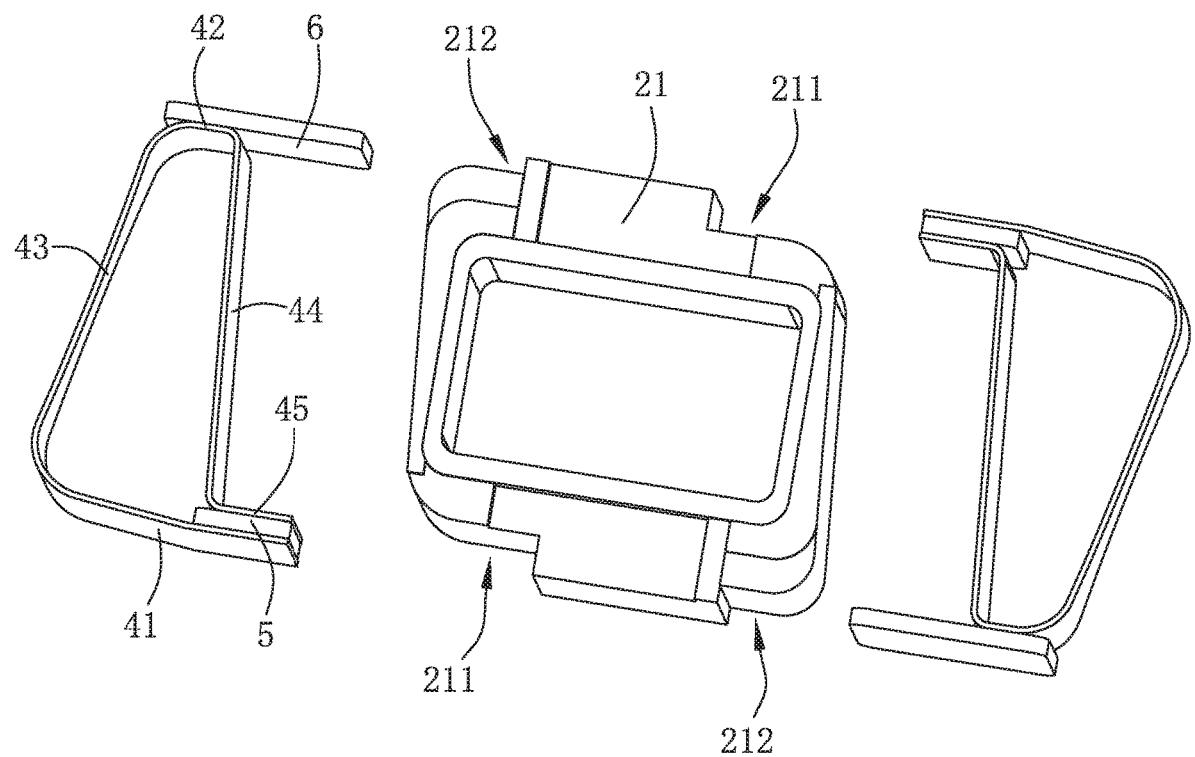
FIG. 2 is an enlarged and exploded view of the linear vibration motor of the exemplary embodiment.
Figure 3:
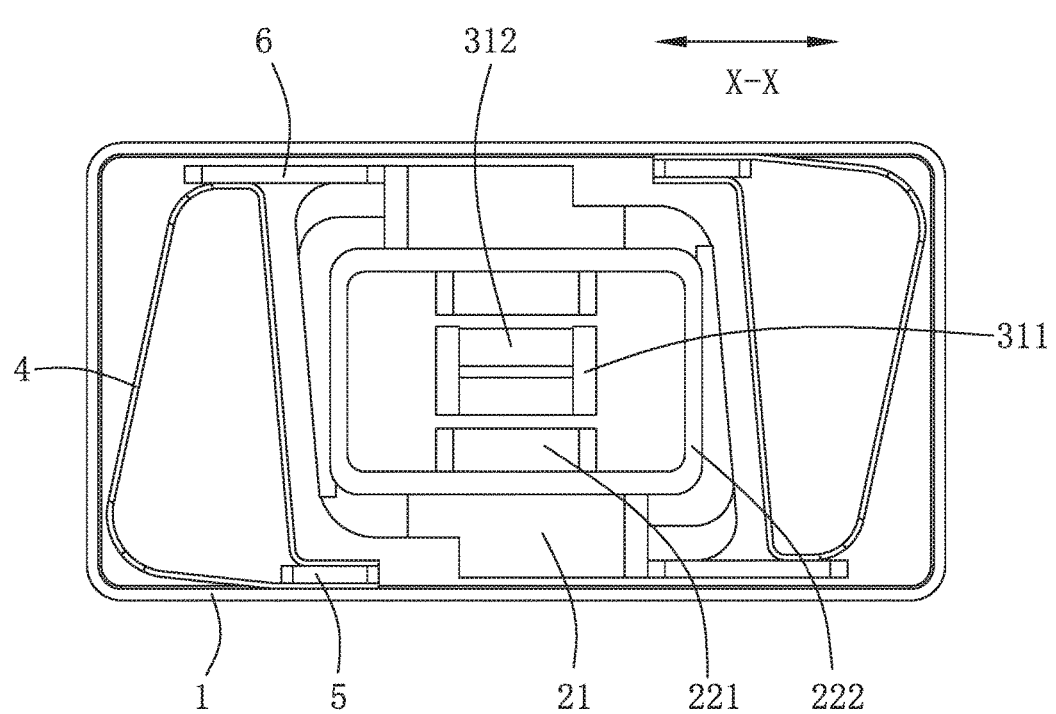
FIG. 3 is an enlarged and isometric view of a main body of the linear vibration motor of the exemplary embodiment.

Please refer to FIGS. 1-3, the exemplary embodiment of the present invention provides a linear vibration motor 100. The linear vibration motor 100 comprises a housing 1 with an accommodation space 10, a vibrator 2 and a stator 3 accommodated in the accommodation space 10, and elastic support parts 4 supporting and suspending the vibrator 2 in the accommodation space 10.

The housing 1 comprises a shell 11 and a cover plate 12 engaging with the shell 11 for cooperatively forming the accommodation space 10.

The vibrator 2 comprises a weight 21 and a magnet assembly 22 fixed to the weight 21. The weight 21 has an accommodating space, and the magnet assembly 22 is fixed and accommodated in the accommodating space. The magnet assembly 22 comprises a magnet 221 and a magnetic bowl 222 arranged at the periphery of the magnet 221.

The stator 3 comprises a coil assembly 31. The coil assembly 31 comprises a coil support 311 fixed on the shell 11 and a coil 312 fixed on the coil support 311. The coil support 311 is arranged in the magnetic bowl 222. The magnet 221 is arranged around the coil support 311.

Two elastic support parts 4 are provided. Each end of the vibrator 2 is respectively provided with an elastic support part 4 along the vibrating direction shown as X-X direction, i.e., the horizontal direction in FIG. 3.

Each elastic support part 4 comprises a first installation part 41, a second installation part 42, a first extension part 43 and a second extension part 44, wherein, the first installation part 41 is fixed to the housing 1, the second installation part 42 is arranged with an interval from the first installation part 41 and fixed to the weight 21. The first extension part 43 bends and extends from one end of the first installation part 41 to connect with one end of the second installation part 42, and the second extension part 44 bends and extends from the other end of the second installation part 42 towards the direction close to the first installation part 41. The stress generated by the vibrator 2 during vibration is borne by the first extension part 43 and the second extension part 44 between the first installation part 41 and the second installation part 42. Compared with the related technology with only one elastic support part of the extension part arranged between two installation parts, the elastic support parts 4 in this embodiment can reduce the stress, lower the breakage risk and prolong the vibrating service life. The linear vibration motor 100 in the exemplary embodiment has an improved reliability.

Further, a spacing between the first extension part 43 and the second extension part 44 gradually decreases from the first installation part 41 to the second installation part 42. Of course, the spacing between the first extension part 43 and the second extension part 44 can also gradually increase from the first installation part 41 to the second installation part 42. The first extension part 43 and the second extension part 44 are arranged with unequal spacing. Compared with the equal spacing arrangement, the elastic support parts 4 are not easy to break during vibration.

Further, each elastic support part 4 comprises a third extension part 45 bending and extending along the vibrating direction from the end of the second extension part 44, wherein, the third extension part 45 and the first installation part 41 are oppositely arranged with an interval therebetween.

Further, the linear vibration motor 100 comprises a first welding sheet 5 arranged between the first installation part 41 and the third extension part 45. The first welding sheet 5 fixes the first installation part 41 and the third extension part 45 by welding, which connects the first installation part 41, the first extension part 43, the second installation part 42, the second extension part 44 and the third extension part 45 in order to enclose to form a closed loop structure. Therefore, the elastic support parts 4 are stable and not easy to be broken to fail.

The first installation part 41 and the housing 1 are fixed by welding. The linear vibration motor 100 further comprises a second welding sheet 6. The second installation part 42 is fixed to the weight 21 by welding through the second welding sheet 6.

The weight 21 is provided with a first avoiding part 211 for avoiding the first installation part 41 and the third extension part 45, and a second avoiding part 212 for avoiding the second welding sheet 6. The first installation part 41 and the third extension part 45 are arranged with intervals from the first avoiding part 211 so as to provide enough vibrating space for the weight 21. One end of the second welding sheet 6 is fixed to the second avoiding part 212 by welding, and the other end is fixed to the second installation part 42 by welding.

When assembling, at first, the first installation part 41 of each elastic support part 4 is welded with the third extension part 45 through the first welding sheet 5, then respectively fix the first installation parts 41 with the housing 1 by welding, the second installation part 42 of each elastic support part 4 is fixed to the weight 21 by welding through the first welding sheet 6, and at last, the other parts of the linear vibration motor 100 are assembled.

Compared with relevant technologies, the elastic support parts 4 in the linear vibration motor 100 provided by the present invention are bent for multiple times to form an annular structure. The stress generated by the vibration of the vibrator 2 is respectively borne by the two extension parts between the two fixation parts of the elastic support parts 4. The elastic support parts 4 are more difficult to deform. Accordingly, the linear vibration motor 100 has better reliability.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, comprising:
   a housing with an accommodation space;
   a vibrator and a stator accommodated in the accommodation space;
   elastic support parts supporting and suspending the vibrator in the accommodation space; each elastic support part including a first installation part fixed to the housing, a second installation part arranged with an interval from the first installation part and fixed to the vibrator, a first extension part bending and extending from one end of the first installation part to connect with one end of the second installation part, a second extension part bending and extending from the other end of the second installation part towards to the first installation part, and a third extension part bending and extending from the end of the second extension part and fixedly connected with the first installation part;
   the third extension part and the first installation part oppositely arranged with an interval therebetween; and
   the linear vibration motor further comprising a first welding sheet arranged between the first installation part and the third extension part for fixing the first installation part to the third extension part by welding.

2. The linear vibration motor as described in claim 1, wherein a spacing between the first extension part and the second extension part gradually decreases from the first installation part to the second installation part.

3. The linear vibration motor as described in claim 1, wherein the first installation part is fixed to the housing by welding; the linear vibration motor further comprises a second welding sheet fixed to the vibrator by welding through the second welding sheet.

4. The linear vibration motor as described in claim 3 including two elastic support parts, wherein each end of the vibrator is respectively connected with one elastic support part along a vibrating direction of the linear vibration motor.

5. The linear vibration motor as described in claim 4, wherein the vibrator comprises a weight and a magnet assembly fixed to the weight; the weight includes a first avoiding part for avoiding the first installation part and the third extension part, and a second avoiding part for avoiding the second welding sheet; the first installation part and the third extension part are arranged with intervals from the first avoiding part; one end of the second welding sheet is fixed to the second avoiding part by welding, and the other end is fixed to the second installation part by welding.

6. The linear vibration motor as described in claim 1, wherein the stator comprises a coil assembly including a coil support fixed on the housing and a coil fixed on the coil support.

\* \* \* \* \*